No. 848,435. PATENTED MAR. 26, 1907.
H. F. L. BROOKS.
FOOT REST.
APPLICATION FILED AUG. 25, 1906.
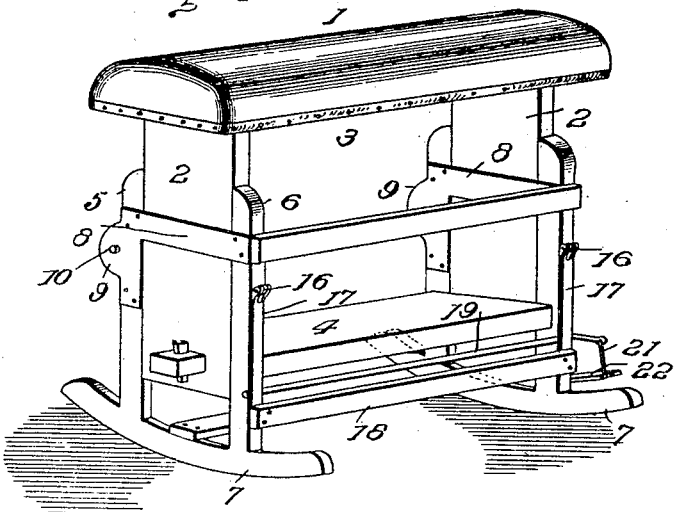
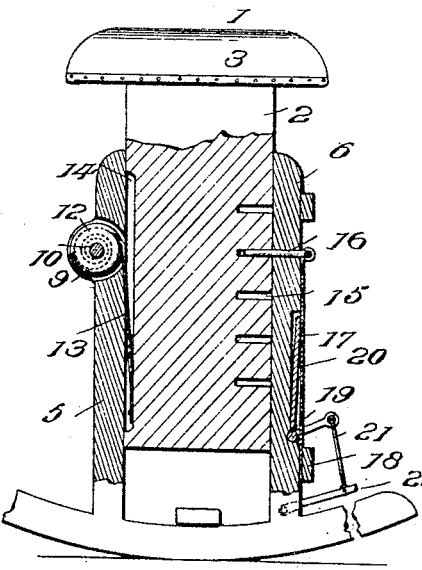 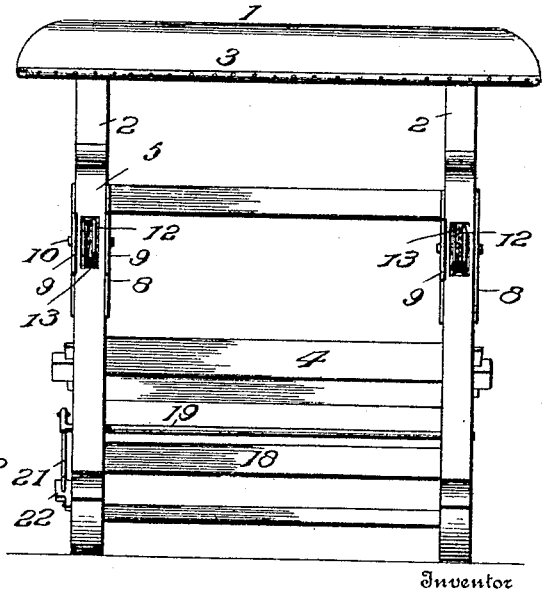

UNITED STATES PATENT OFFICE.

HENRY F. L. BROOKS, OF SHELDON, IOWA.

FOOT-REST.

No. 848,435.  Specification of Letters Patent.  Patented March 26, 1907.

Application filed August 25, 1906. Serial No. 332,060.

*To all whom it may concern:*

Be it known that I, HENRY F. L. BROOKS, of Sheldon, in the county of O'Brien and State of Iowa, have invented certain new and useful Improvements in Foot-Rests; and I do hereby declare the following to be a full, clear, and exact description of the invention, such as will enable others skilled in the art to which it appertains to make and use the same.

The object of this invention is to provide an adjustable foot-rest capable of being readily and easily operated and which will be devoid of all complications and which will be inexpensive and not liable to readily get out of order.

The invention will be hereinafter fully set forth, and particularly pointed out in the claims.

In the accompanying drawings, Figure 1 is a view in perspective of my improved foot-rest. Fig. 2 is a side view, partly in section. Fig. 3 is a front elevation.

Referring to the drawings, 1 designates the foot-support, composed of two corresponding vertical side bars 2, a connecting-bar 3, which latter is preferably upholstered, and a lower connecting-bar 4. Each of the side bars 2 fits between guides composed of spaced-apart uprights 5 and 6, mounted on rockers 7, which latter permit the rest as a whole to conform to any desired angle. At or near their upper ends uprights 5 and 6 of each guide are connected by inner and outer plates 8, which are shown as continuations of the sides of bearings 9 for the journals 10 of spring-actuated drums or pulleys 12, the latter fitting in edge cut-outs of uprights 5.

Cords or chains 13, wound around and secured to the drums 12, are also secured to one edge of each side bar 2, near the lower end thereof. The tension of the springs of these drums tends to lift the foot-support so that when not restrained the latter will normally be in its elevated position. The front edges of the side bars 2 are formed with grooves 14, so as to prevent undue friction between the chains and said side bars in the raising and lowering of the support. In the rear edge of each side bar is formed a series of holes 15.

16 16 designate retaining-pins fitted in the rear uprights 6 and designed to enter corresponding holes 15 in the edges of the respective side bars for retaining the support in its adjusted position as against the tension of the spring-drums. These retaining-pins are capable of being moved outwardly on approximately horizontal planes to disengage them from the side bars of the support to permit the latter to be lowered as against the tension of spring-drums. When this is to be done, a slight pressure is first applied to the support, so as to relieve the strain on the retaining-pins and to permit them to be readily disengaged. Each of these pins is pivotally connected at its outer end to the upper end of a spring-plate 17, which spring-plates are secured at their lower ends to the rear faces of the uprights 6 by any suitable means, that shown consisting of a cross-bar 18.

19 designates an operating-rod mounted in the rear face of upright 6 and having laterally-extended arms 20, which lie between spring-plates 17 and the rear faces of uprights 6, such arms normally fitting in grooves formed in said faces of the uprights. This rod 19 is cranked at one end and connected by a link 21 to a foot-lever 22, fulcrumed on one of the uprights 6, near the lower end thereof. By bearing downwardly on this foot-lever rod 19 will be turned axially sufficiently to cause its arms 20 to throw the spring-plates 17 outwardly, and thereby disengage the retaining-pins from the side bars of the support.

In practice pressure is applied upon the connecting-bar 3 previous to effecting the disengagement of the retaining-pins, and after the latter are withdrawn the support is forced downwardly or permitted to move upwardly under the tension of its spring-drums, the cords or chains being held taut by the latter. When the support is at the desired height, pressure on the foot-lever is removed, and the retaining-pins immediately spring into their normal position, locking the support in place. It will be observed that the rest being mounted on rockers may be set at any desired angle and also that the lower connecting base-board 4 is inclined, so that it also may be used as a foot-rest or employed as a shelf for books, papers, or periodicals.

I claim as my invention—

1. A foot-rest comprising corresponding guides, a foot-support having at its ends corresponding side bars each fitted in one of said guides, said side bars each having in one edge a series of holes, spring-drums supported by said guides, cords or chains connected to said drums and to said side bars, horizontally-disposed retaining-pins mounted in said guides and designed to project into corresponding holes of said side bars, springs for normally holding said retaining-pins in engagement with said side bars, and means for simultaneously disengaging each of said retaining-pins, said drums effecting the raising of said foot-support when said pins are disengaged from the side bars thereof.

2. The combination with the guides composed of corresponding uprights, of retaining-pins fitted in said guides, spring-plates secured to said retaining-pins, a cross-rod having arms for engaging with said spring-plates, a foot-lever connected to said cross-rod, a foot-support having corresponding side bars fitted in said guides and designed to be held by said retaining-pins, and means connected to said side bars for effecting the automatic raising of said support when the retaining-pins are disengaged from said side bars.

In testimony whereof I have signed this specification in the presence of two subscribing witnesses.

HENRY F. L. BROOKS.

Witnesses:
HUBERT H. PERRY,
G. T. WELLMAN.